United States Patent [19]

Ohtsuki et al.

[11] Patent Number: 5,388,916
[45] Date of Patent: Feb. 14, 1995

[54] DEVICE FOR DETECTING THE SPEED OF ROTATION OF AUTOMOBILE WHEEL

[75] Inventors: Hisashi Ohtsuki, Shizuoka; Koji Sahashi, Mie, both of Japan

[73] Assignee: NTN Corporation, Osaka, Japan

[21] Appl. No.: 995,411

[22] Filed: Dec. 18, 1992

[30] Foreign Application Priority Data

Dec. 26, 1991 [JP] Japan .............................. 3-107420[U]

[51] Int. Cl.⁶ .......................... F16C 33/00; F16C 35/00
[52] U.S. Cl. .................................................. 384/448
[58] Field of Search .................. 384/448; 324/173, 174

[56] References Cited

U.S. PATENT DOCUMENTS

| | | | |
|---|---|---|---|
| 4,960,333 | 10/1990 | Faye et al. | 384/448 |
| 4,986,605 | 1/1991 | Descombes | 324/173 |
| 5,046,867 | 9/1991 | Hilby et al. | 384/448 |

Primary Examiner—Lenard A. Footland
Assistant Examiner—John Q. Nguyen
Attorney, Agent, or Firm—Nikaido, Marmelstein, Murray & Oram

[57] ABSTRACT

A revolving speed detecting device for use on a bearing for a vehicle wheel. The bearing has a rotatable ring and a fixed ring. The device has a pulser ring mounted on one of the two rings at one end thereof and a press-fit ring mounted on the other of the two rings at the one end thereof. The pulser ring is located inside the press-fit ring. The press-fit ring is integrally provided with a sensor housing unit filled with a resin. A rotation sensor has a sensing unit embedded in the resin in the sensor housing unit. The sensing unit has a sensor element received in a hole formed in the press-fit ring so as to be located opposite to the pulser ring through a gap. A seal member is provided between the press-fit ring and the rotatable ring to seal the space therebetween.

4 Claims, 4 Drawing Sheets

FIG. 7 *PRIOR ART*
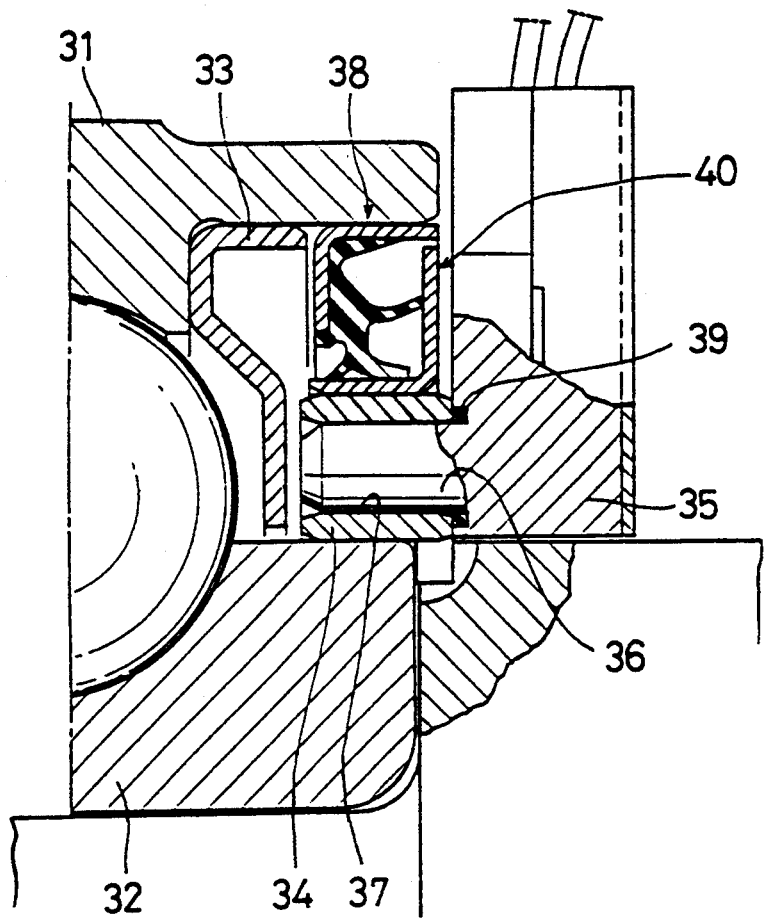
FIG. 8 *PRIOR ART*
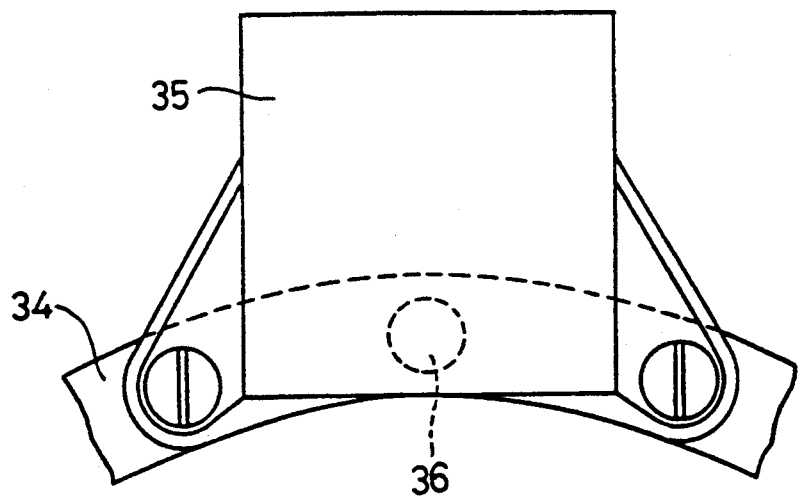

DEVICE FOR DETECTING THE SPEED OF ROTATION OF AUTOMOBILE WHEEL

BACKGROUND OF THE INVENTION

This invention relates to a detecting device for detecting the revolving speed of a bearing for supporting a wheel of an automobile or the like.

It is essential to detect the revolving speed of the wheels of an automobile with high accuracy on an automobile equipped with an antilock brake system. For this purpose, a pulser ring and a rotation sensor are mounted on a ring of a bearing rotatably supporting each wheel to detect the revolving speed of the wheel by detecting magnetic changes with the rotation of the pulser ring.

It is necessary to provide such a revolving speed detecting device with means for protecting the pulser ring and the rotation sensor against flying stones and muddy water. A device provided with such a protection is disclosed in Japanese Utility Model Application 2-115042 filed by the present applicant.

As shown in FIGS. 7 and 8, this prior device comprises a pulser ring 33 mounted on a rotating ring 31 of a wheel bearing, a ring 34 press-fitted on a fixed ring 32, and a rotation sensor 35 bolted on the outer surface of the press-fitted ring 34. The rotation sensor 35 has a sensing unit 36 received in a hole 37 formed in the ring 34.

A seal member 38 is provided between the press-fit ring 34 and the rotating ring 31 to seal the pulser ring 33 from the surrounding environment.

In the above arrangement, the press-fit ring 34 and the rotation sensor 35 are separate members. This leads to increase in the number of parts to be assembled together. Also, this arrangement requires the provision of a seal member 39 such as an O-ring between the sensing unit 36 and the ring 34 to keep off muddy water or the like.

Further, in order to prevent the rotation sensor 35 from getting loose due to vibration of the car, the torque for tightening the screws with which the sensor 35 is secured to the ring 34 has to be controlled with high accuracy. This lowers the efficiency of assembly work.

Further, in this arrangement, a seal ring 40 is mounted on the ring 34 so as to be in sliding contact with a lip of the seal member 38. This creates the problem of a poor seal between the press-fit ring 34 and the seal ring 40. Also, this arrangement has a problem in that the diametric dimension of the space for accommodating the seal member 38 is small.

SUMMARY OF THE INVENTION

It is therefore an object of this invention to provide a revolving speed detecting device which is compact in size, simple in structure and easy to assemble and which has an excellent shock resistance.

In order to solve the above problems, according to this invention, there is provided a revolving speed detecting device for use with a bearing for a vehicle wheel, the bearing having a rotatable ring and a fixed ring each having a surface opposed to the other, the device comprising a pulser ring mounted on one of the rotatable ring and the fixed ring at one end thereof, a press-fit ring mounted on the other of these two rings at the one end thereof, the pulser ring being located inside of the press-fit ring, a sensor housing unit integral with the press-fit ring and filled with a resin, a rotation sensor housed in the sensor housing unit and having a sensing unit embedded in the resin in the sensor housing unit, the sensing unit having a sensor element received in a hole formed in the press-fit ring so as to be located opposite to the pulser ring through a gap, and a seal member provided between the press-fit ring and the rotatable ring to seal the space therebetween.

As another means, there is provided a revolving speed detecting device wherein the seal member has a sealing lip kept in sliding contact with the sealing surface on the press-fit ring.

With this arrangement, the pulser ring rotates together with the rotatable bearing ring. Changes in the magnetic field with the rotation of the pulser ring are detected at the detecting end of the rotation sensor.

Also, since the rotation sensor is housed in the press-fit ring, there is no need to assemble the rotation sensor with the press-fit ring to the rotation sensor or to provide a seal there between.

Since the seal member is in direct sliding contact with the surface of the press-fit ring, it becomes possible to improve the sealing performance of the seal member because it can be mounted in a larger space.

The rotation sensor can be perfectly protected against external shocks. This makes it possible to reduce the size of the device and improve the sealing performance as well as the reliability of detection of revolving speeds.

Other features and objects of the present invention will become apparent from the following description taken with reference to the accompanying drawings, in which:

FIG. 7 is a sectional view of a prior device; and

FIG. 8 is a front view of the same.

DETAILED DESCRIPTION OF PREFERRED EMBODIMENTS

Figure 1:
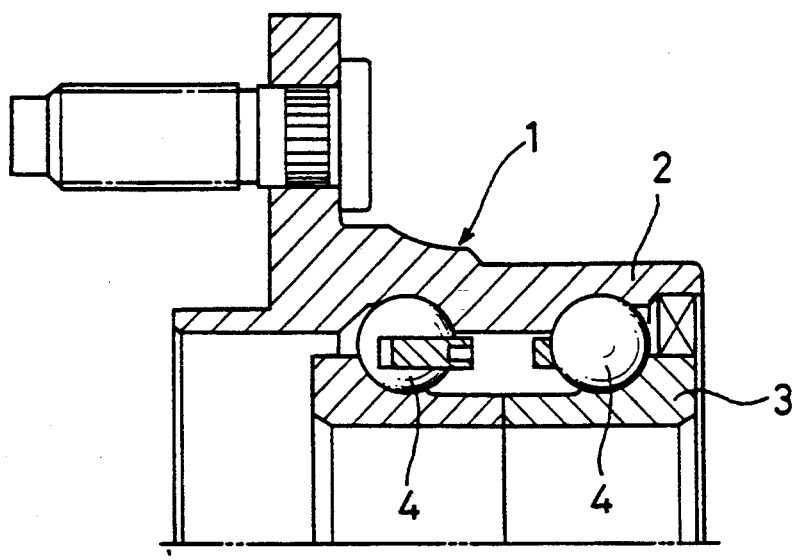
FIG. 1 is a sectional view of a bearing for a vehicle wheel.
Figure 2:
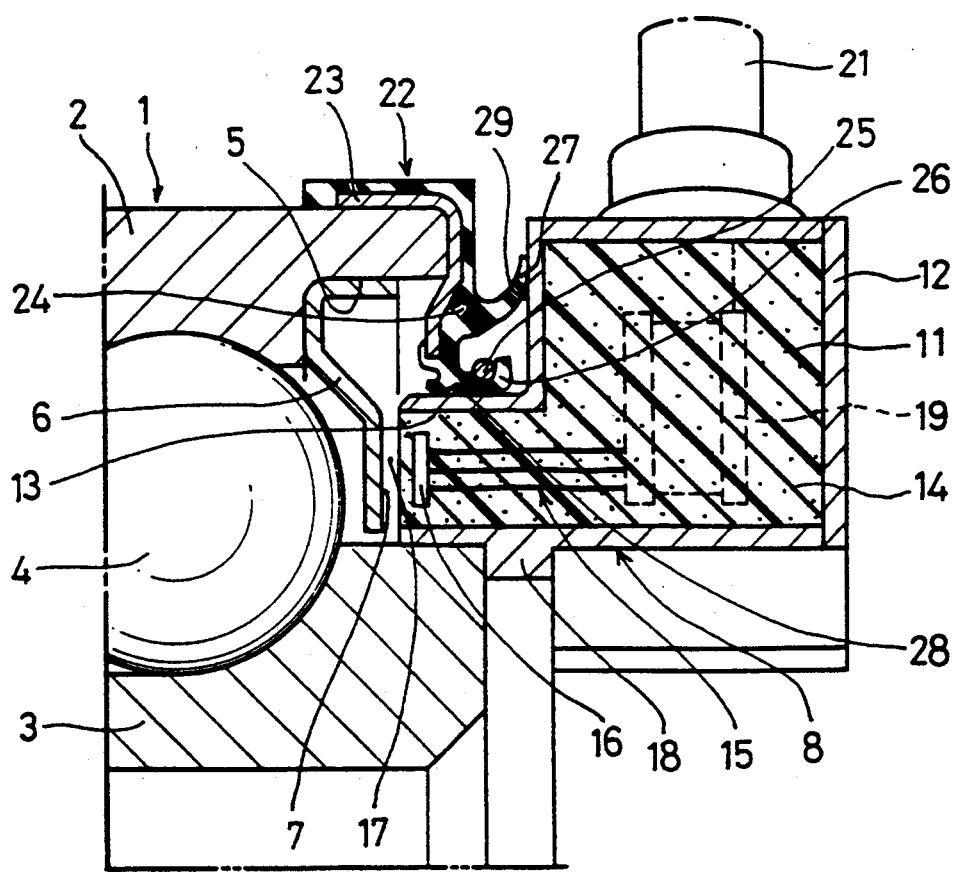
FIG. 2 is a sectional view of the revolving speed detecting device of one embodiment.

FIG. 1 shows a bearing for a wheel of an automobile. FIG. 2 shows one embodiment of a revolving speed detecting device which is to be mounted on the wheel bearing.

The wheel bearing 1 comprises, as shown in FIG. 1, an outer ring 2, an inner ring 3, and rolling elements 4 mounted between the rings 2 and 3. The outer ring 2 is rotatable together with the wheel while the inner ring 3 is supported on the fixed axle.

The outer ring 2 has a cylindrical surface 5 on one end of its inner peripheral surface. A pulser ring 6 is press-fitted on the cylindrical surface 5. It is made of a rolled magnetic material such as an Fe-Cr-Co alloy. N- and S-poles are formed on an inner side surface 7 thereof so as to circumferentially alternate with each other.

Figure 3:
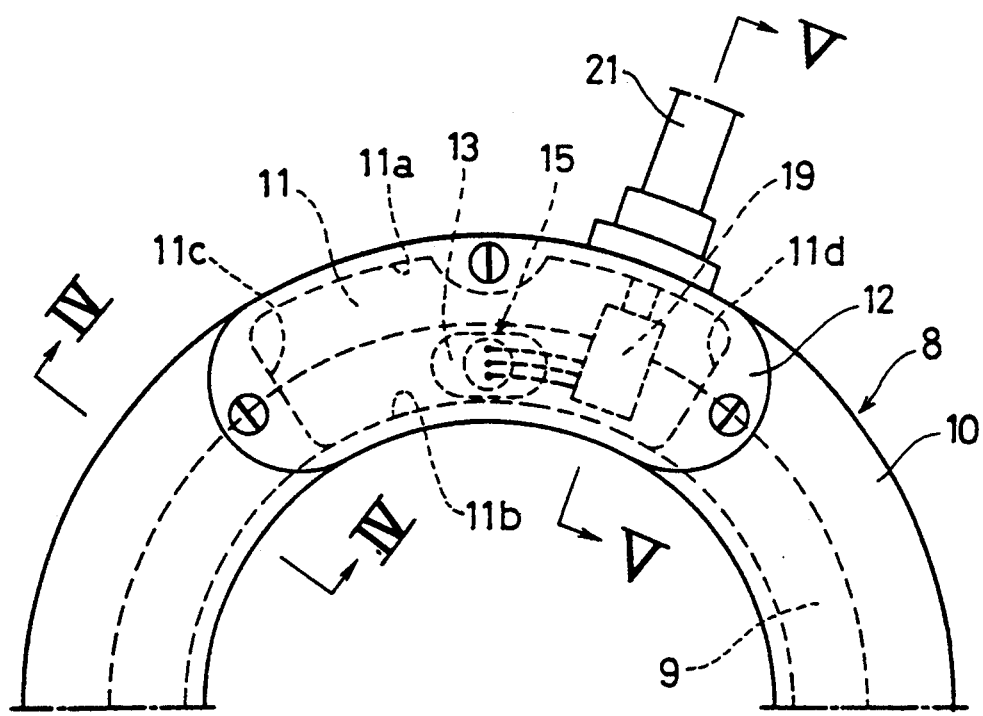
FIG. 3 is a front view of the rotation sensor housing unit.
Figure 4:
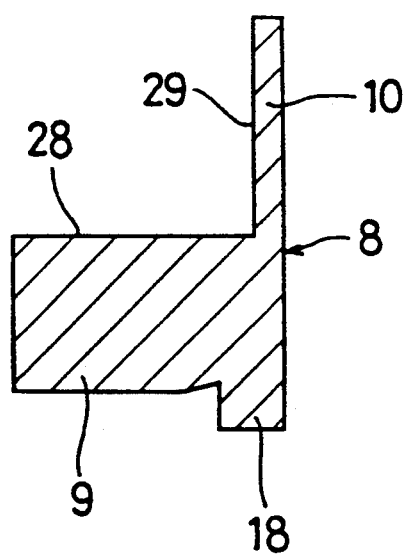
FIG. 4 is a sectional view taken along line IV—IV of FIG. 3.

On the other hand, a metal ring 8 is press-fitted on the outer peripheral surface of the inner ring 3 at one end thereof. As shown in FIG. 4, the press-fit ring 8 comprises a cylindrical portion 9 press-fit on the inner ring 3 and a flange 10 extending from the cylindrical portion at a right angle. Further, it has a box-shaped sensor housing unit 11 integrally provided on a part of its peripheral surface as shown in FIGS. 2 and 3.

The sensor housing unit 11 comprises peripheral walls 11a and 11b and side walls 11c and 11d which are integral with the press-fit ring 8 and a back plate 12 screwed to the back of the housing unit 11. The housing unit 11 also has a hole 13 formed in the cylindrical portion 9 so as to face the pulser ring 6. The sensor housing unit 11 is filled with a resin 14 in which is embedded a sensing unit 15 of a rotation sensor. The sensing unit 15 has a sensor element 16 such as a Hall element or an MR element, which is received in the hole 13.

The sensor element 16 is disposed near the opening of the hole 13 so as to oppose to the pulser ring 6 through a predetermined gap 17. The press-fit ring 8 is provided on the inner peripheral surface thereof with a protrusion 18 which serves as a stopper when press-fitting it onto the inner ring 3. The press-fit ring 8 is positioned by abutting the protrusion 18 against the end face of the inner ring 3. In this state, a predetermined gap 17 is defined between the sensor element 16 and the pulser ring 6.

Figure 5:
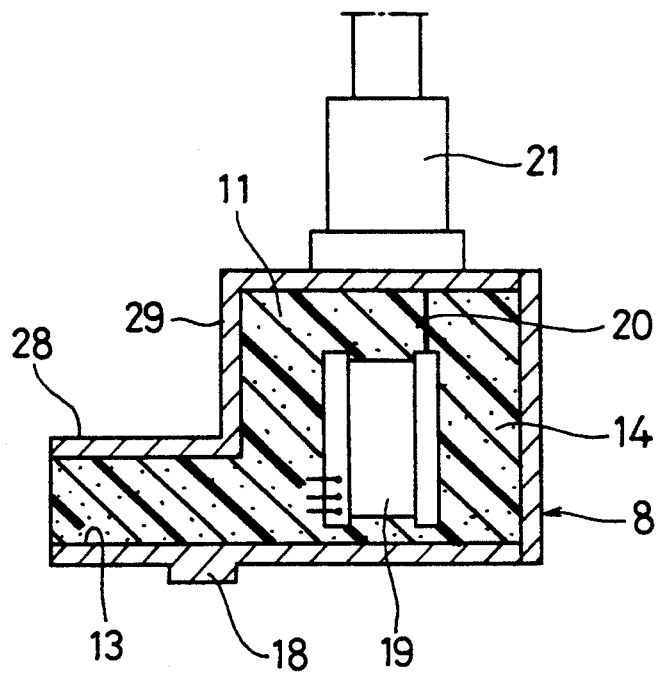
FIG. 5 is a sectional view taken along line V—V of FIG. 3.

Also embedded in the sensor housing unit 11 at a location circumferentially offset from the sensing unit 15 of the rotation sensor is a signal processing circuit board 19 (FIG. 5) for converting the signals from the sensing unit 15 to electrical signals. A lead 20 extending from the circuit board 19 is connected through a cable 21 connected to the press-fit ring 8, to an external unit (not shown).

A seal member 22 is mounted on the end face of the outer ring 2 to seal the gap between the press-fit ring 8 and the outer ring 2. It comprises a core ring 23 press-fitted on the end of the outer periphery of the outer ring 2, an elastic seal 24 integral with the core ring 23 and a garter spring 25 biasing the elastic seal 24 so as to reduce its diameter.

The elastic seal 24 is provided on the inner peripheral surface thereof with a seal lip 26 which is pressed by the garter spring 25 against a sealing surface 28 formed on the outer periphery of the cylindrical portion 9 of the press-fit ring 8. Also, the elastic seal 24 has a side seal lip 27 which extends laterally from its side face and comes into sliding contact with a sealing surface 29 formed on the flange 10 of the press-fit ring 8.

In operation, as the wheel begins to rotate, the outer ring 2 and the pulser ring 6 will rotate. Change in the magnetic field with the rotation of the pulser ring 6 are detected by the sensing unit 15. The signals therefrom are converted into electrical signals in the signal processing circuit board 19. The electrical signals are sent to an external unit.

In this arrangement, since the sensing unit 15 of the rotation sensor is housed in the press-fit ring 8, there is no need of providing any seal member between the rotation sensor and the press-fit ring 8. Also, there is no need of assembling the rotation sensor and the press-fit ring 8 together.

The sensing unit 15 of the rotation sensor and the signal processing circuit board 19 are provided in the sensor housing unit 11 of the press-fit ring 8 so as to be circumferentially offset from each other. This arrangement is effective in reducing the axial dimension of the device. Also, the rotation sensor can be perfectly protected against shocks due to collision with stones and sands.

The seal member 22 has its seal lips 26 and 27 kept in direct sliding contact with the sealing surfaces 28 and 29, respectively, so that there is no need to provide a seal ring. This serves to improve the sealing performance of the seal member 22 because it can be mounted in a space having a sufficiently large diametric dimension.

Figure 6:
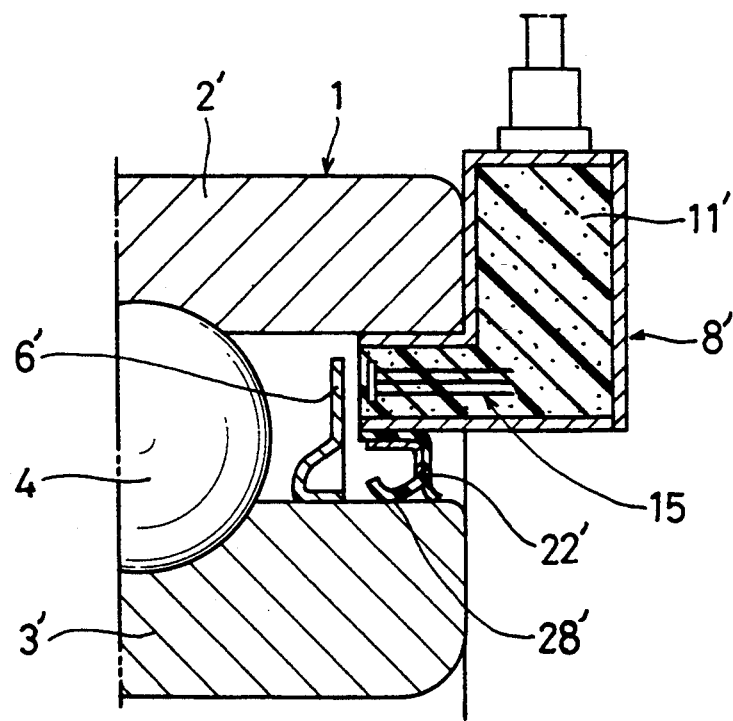
FIG. 6 is a sectional view of another embodiment.

FIG. 6 shows an embodiment applicable to a bearing in which the inner ring rotates. In this embodiment, a pulser ring 6' is mounted on the outer peripheral surface of the inner ring 3' and a press-fit ring 8' is mounted on the fixed outer ring 2'. The press-fit ring 8' has a sensor housing unit 11' which houses a rotation sensor. A seal member 22' is mounted on the inner peripheral surface of the press-fit ring 8'. It has a seal lip 28' kept in sliding contact with the outer peripheral surface of the inner ring 3'. As for the function and other structures, this embodiment is the same as the first embodiment. Thus, like parts are denoted by like numerals and their description is omitted.

What is claimed is:

1. A revolving speed detecting device for use with a bearing for a vehicle wheel, said bearing have a rotatable ring and a fixed ring each having a surface opposed to the other, said device comprising a pulser ring mounted on one of said rotatable ring and said fixed ring at one end thereof, a press-fit ring mounted on the other of said two rings at the one end thereof, said pulser ring being located a gap from said press-fit ring, a sensor housing unit integral with said press-fit ring and filled with a resin, a rotation sensor housed in said sensor housing unit and having a sensing unit embedded in said resin in said sensor housing unit, said sensing unit having a sensor element received in a hole formed in said press-fit ring so as to be located opposite to said pulser ring separated by a predetermined gap, and a seal member provided between said press-fit ring and said rotatable ring to seal the space therebetween.

2. A revolving speed detecting device as claimed in claim 1 wherein said seal member has a sealing lip kept in sliding contact with said sealing surface on a press-fit ring.

3. A revolving speed detecting device as claimed in claim 1 wherein said rotatable ring is an outer ring of the bearing and said fixed ring is an inner ring thereof, 4. A revolving speed detecting device as claimed in claim 1 wherein said rotatable ring is an inner ring of the bearing and said fixed ring is an outer ring thereof.

* * * * *